United States Patent
Kuhn et al.

(10) Patent No.: US 6,792,773 B2
(45) Date of Patent: Sep. 21, 2004

(54) COLLECTOR FOR THE LIQUID PHASE OF A WORKING MEDIUM OF AN AIR CONDITIONING SYSTEM

(75) Inventors: Peter Kuhn, Weinheim (DE); Frank Obrist, Dornbirn (AT)

(73) Assignees: DaimlerChrysler AG, Stuttgart (DE); Obrist Engineering GmbH, Lustenau (AT)

( * ) Notice: Subject to any disclaimer, the term of this patent is extended or adjusted under 35 U.S.C. 154(b) by 0 days.

(21) Appl. No.: 10/432,552
(22) PCT Filed: Nov. 21, 2001
(86) PCT No.: PCT/EP01/13510
§ 371 (c)(1), (2), (4) Date: Dec. 23, 2003
(87) PCT Pub. No.: WO02/42697
PCT Pub. Date: May 30, 2002

(65) Prior Publication Data
US 2004/0093894 A1 May 20, 2004

(30) Foreign Application Priority Data
Nov. 24, 2000 (DE) .......................................... 100 58 513

(51) Int. Cl.⁷ .............................. F25B 43/00; F25B 1/00
(52) U.S. Cl. .............................. 62/503; 62/502; 62/512; 62/471
(58) Field of Search .......................... 62/512, 470, 471, 62/502, 503; 55/337, 426, 459.1

(56) References Cited

U.S. PATENT DOCUMENTS

| | | | |
|---|---|---|---|
| 3,411,319 A | | 11/1968 | Thompson et al. |
| 3,877,904 A | * | 4/1975 | Lowrie .......................... 96/189 |
| 4,142,380 A | * | 3/1979 | Dyhr et al. .................... 62/471 |
| 4,506,523 A | | 3/1985 | DiCarlo et al. |
| 5,347,817 A | | 9/1994 | Kim |
| 5,551,255 A | | 9/1996 | Rothfleisch |
| 5,850,743 A | | 12/1998 | Dreiman et al. |
| 6,062,039 A | * | 5/2000 | Haramoto et al. ............. 62/503 |

\* cited by examiner

Primary Examiner—Chen Wen Jiang
(74) Attorney, Agent, or Firm—Crowell & Moring LLP

(57) ABSTRACT

A collector for the liquid phase of the working medium of an air conditioning system has first and second connecting pipes provided for connection into the circuit of an air conditioning system. One of the connecting pipes continues in a guide tube which is guided through the interior of the container of the collector. Part of the guide tube runs through the bottom region of the container, which is provided for vertical arrangement, and has at least one opening for recycling collected oil and the liquid phase of the working medium into the working medium circulating through the air conditioning system. In order to separate the liquid phase of the working medium of the air conditioning system, a cyclone-like separating device is provided. The separating device has a cyclone chamber and a central outflow connecting pipe forming an overflow. One of the connecting pipes leads tangentially into the cyclone chamber and the open end of the guide tube ends at a short distance before the outflow connecting pipe. The collector is thereby effective as a separating device for separating off liquid phases owing to the cyclone effect in the cyclone chamber when flow passes from the first connecting pipe to the second connecting pipe while, when the direction of flow is reversed, the collector returns the liquid phase, including oil, present in the collector through the opening into the flow in the circuit.

21 Claims, 3 Drawing Sheets

COLLECTOR FOR THE LIQUID PHASE OF A WORKING MEDIUM OF AN AIR CONDITIONING SYSTEM

BACKGROUND AND SUMMARY OF THE INVENTION

This invention relates to a collector for the liquid phase of the working medium of an air conditioning system, having a first and second connecting pipes provided for connection into the circuit of the air conditioning system. A guide tube is connected to the second connecting pipe and is guided through the interior of the container, so that part of the guide tube runs through the bottom region of the container, which is provided for vertical arrangement, and its open end is situated in the upper region of the container. That part of the guide tube which runs through the bottom region has at least one opening for recycling collected oil and the liquid phase of the working medium into the working medium circulating through the air conditioning system.

A collector of this type is disclosed by German publication DE 19842019 A1. This collector has the disadvantage of not being suitable for an air conditioning system with an optional heat pump mode since, during the required reversal of the direction of flow, said collector prevents collected oil from being recycled into the circuit of the air conditioning system. This results from the fact that medium flowing out from the guide tube into the container discards its oil fraction in the container before it can be taken up by the outlet connecting pipe. The accumulation of oil which is therefore possible in the collector brings the risk of the compressor of the air conditioning system failing due to lack of oil.

German publication DE 2650935 C3 discloses a centrifugal separator for a refrigerator, having a multipart, vertically orientated housing in which there is arranged, from the top downward, first of all a cylindrical, then a conical separating space and finally a liquid collecting space. An inlet connecting pipe and, in the direction of the vertical axis, a dip tube which merges into a suction gas duct lead tangentially into the cylindrical separating space. Cleaning of the refrigerant takes place by separating off liquid and particles along a defined flow path. A reversal of the direction of flow is neither envisaged nor possible.

One object of this invention is the object of finding a collector which ensures that oil is discharged from the liquid phase even if the direction in which the flow passes through the container is reversed, and which also has an improved separating effect for separating off the liquid phase of the medium.

The above mentioned object is achieved according to the invention by a device having the features of claim 1. In this case, in order to separate off the liquid phase, a cyclone-like separating device having a cyclone chamber and having a central outflow connecting pipe forming an overflow is provided, into which one of the connecting pipes leads tangentially, with the open end of the guide tube ending at a distance on the same axis before this outflow connecting pipe, so that when the flow through the collector passing from the second connecting pipe via the guide tube to the cyclone chamber is reversed, the liquid phase and oil can be driven out of the collector via the hole and the tangential connecting pipe.

The invention will be explained in greater detail below with reference to two exemplary embodiments illustrated in the drawings.

DETAILED DESCRIPTION OF THE INVENTION

Figure 1:
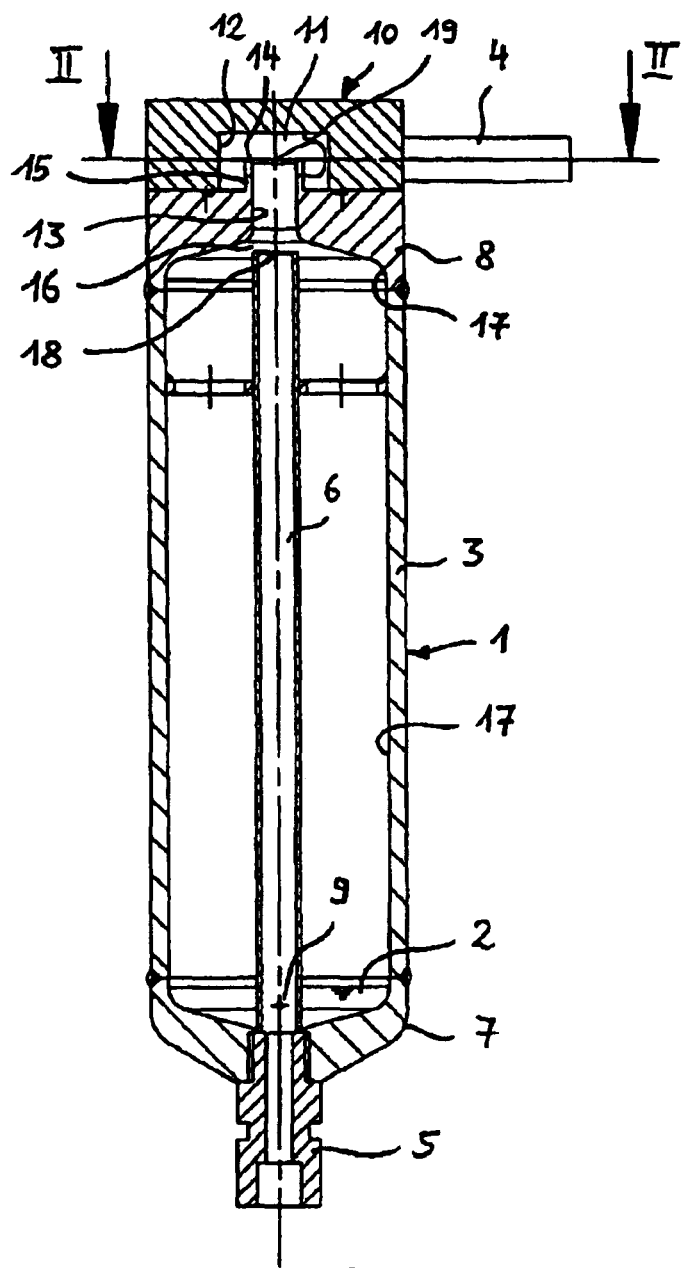
FIG. 1 shows an axial section through a collector having an uncurved guide tube.

The collector 1 for the liquid phase 2 of the working medium of an air conditioning system has an elongate, cylindrical container 3, for vertical arrangement, which is preferably provided in the engine compartment of a vehicle and on which a first and second connecting pipes 4, 5 are provided, for connection of the collector 1 into the circuit of an air conditioning system. A guide tube 6 extends through the container 3, said guide tube being connected to the second connecting pipe 5, running through the bottom region 7 of the container 3 and ending open in the upper region 8 of the container 3.

That part of the guide tube 6 which runs through the bottom region 7 of the container 3 has at least one intake opening 9 for oil which has settled in this container region 7 below the liquid phase of the medium of the air conditioning system, and so said oil passes back into the working medium circulating through the air conditioning system.

A cyclone-like separating device 10 is provided in the upper region 8 of the container 3, for separating off the liquid phase from the medium flowing through the connecting pipe 4. Said separating device has a cyclone chamber 11 into which the connecting pipe 4 leads tangentially, so that the medium circulates along the inner surface 12 of the cyclone chamber 11 and the liquid phase which separates off owing to centrifugal force accumulates in the lower part of the cyclone chamber 11 before it flows off along the inner surface 13 of a central outflow connecting pipe 15, which forms an overflow 14, to the interior of the container 3, together with a small quantity of oil. The gaseous phase of the medium also passes from the cyclone chamber 11 into the outflow connecting pipe 15 and flows from the latter into the central guide tube 6 which is adjacent to it at a small distance 16. The above mentioned distance 16 makes it possible for the liquid phase to flow out of the cyclone chamber 11 along the container wall 17 into the container 3, away from the gaseous phase which flows off centrally in the same direction into the guide tube 6.

The arrangement of the mouth 18 of the guide tube, which arrangement ends on the same axis at a short distance 16 before the outflow connecting pipe 15, and the described, structural design of the cyclone-like separating device 10 ensure that even when the flow passes through the collector 1 in the reverse direction, i.e. in the direction from the second connecting pipe 5 to the first connecting pipe 4, a discharge of liquid phase 2 and of oil from the collector 1 takes place. In this case, the negative pressure which arises when the flow passes through the guide tube 6 causes the liquid phase 2 and/or oil to be taken in through the hole 9 and to be introduced into the cyclone-like separating device 10. It strikes there against the upper wall 19 of the cyclone chamber 11, said wall acting as a baffle, and is pressed from there against the peripheral surface 12 of said chamber in order to flow from the latter via the tangential connecting pipe 4 into the circuit of the air conditioning system.

Figure 2:
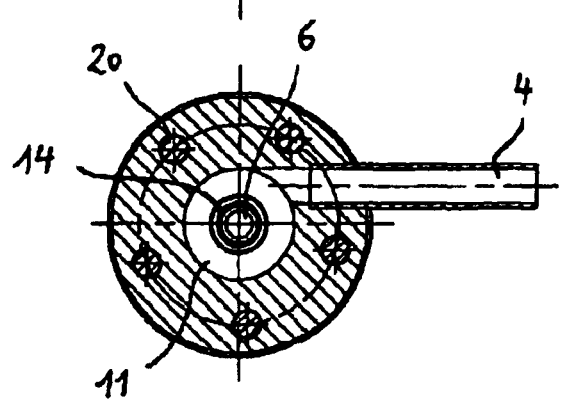
FIG. 2 shows a radial section along the line II—II of FIG. 1.

The exemplary embodiments of FIGS. 1 and 2, on the one hand, and of FIGS. 3 and 4 and 5 and 6, on the other hand, differ, apart from the different manner in which the cyclone-like separating device 10 is connected during production to the container 3, essentially by the arrangement of the connecting pipes 4, 5 firstly in the upper and lower regions 7, 8 of the container 3 and secondly jointly in the upper region 8 of the container.

The arrangement of the two connecting pipes 24, 25 in the upper region 28 of the container 23 necessitates a different shape of the guide tube 26 in order to guide a part 30 thereof, which part has at least one intake opening 29, through the lower region 27 of the container 23. For this purpose, the guide tube 26 has a deflection 31 in the shape of a hairpin in order to continue to guide it upward with its mouth 32 at a short distance from the outflow connecting pipe 33. As a result, even with such an arrangement of the connecting pipes 24, 25, the manner of operation described with reference to the exemplary embodiment according to FIG. 1 is ensured.

Figure 3:
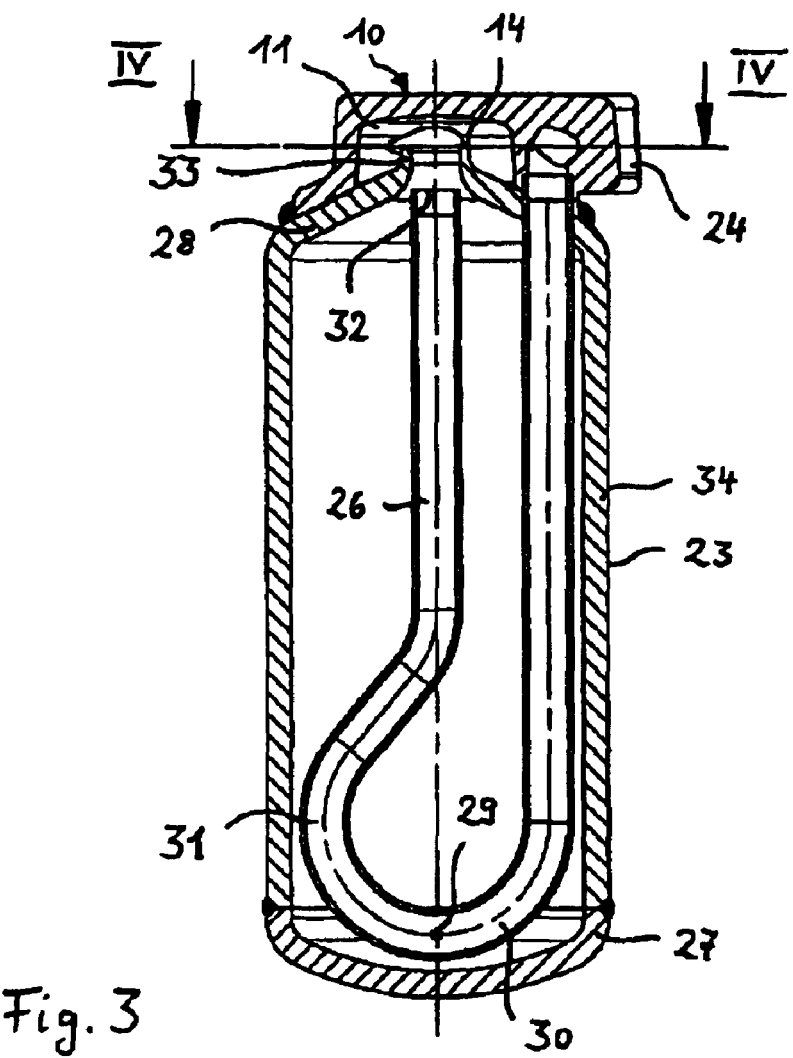
FIG. 3 shows an axial section through a collector having a curved guide tube along the line III—III of FIG. 4.

In the case of the exemplary embodiment according to FIG. 3, the outflow connecting pipe 33 is formed in the shape of a bottle neck by deepdrawing drawing from the wall 34 of the container 23, and the cyclone-like separating device is welded in the form of a cap onto the curved, upper region 28 of the container 23. In contrast to this, in the case of the exemplary embodiment according to FIG. 1, the upper, curved region 8 of the container 3 is welded with the outflow connecting pipe 15 to a cylindrical part of the wall of the container 3 and the cyclone-like separating device 10 is fastened in the manner of a flange to the upper region 8 of the container 3 by means of screw bolts 20.

Figure 4:
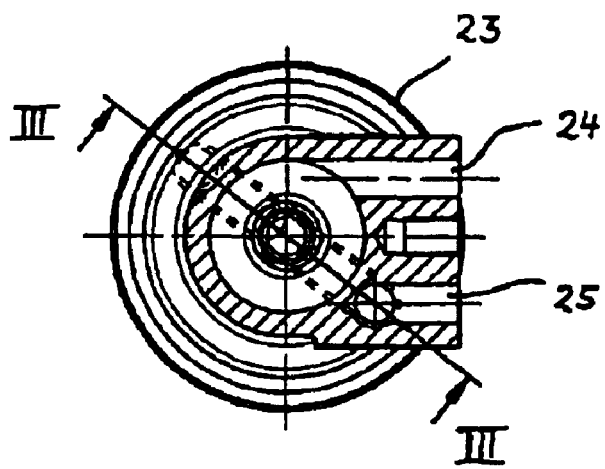
FIG. 4 shows a radial section along the line IV—IV of FIG. 3.
Figure 5:
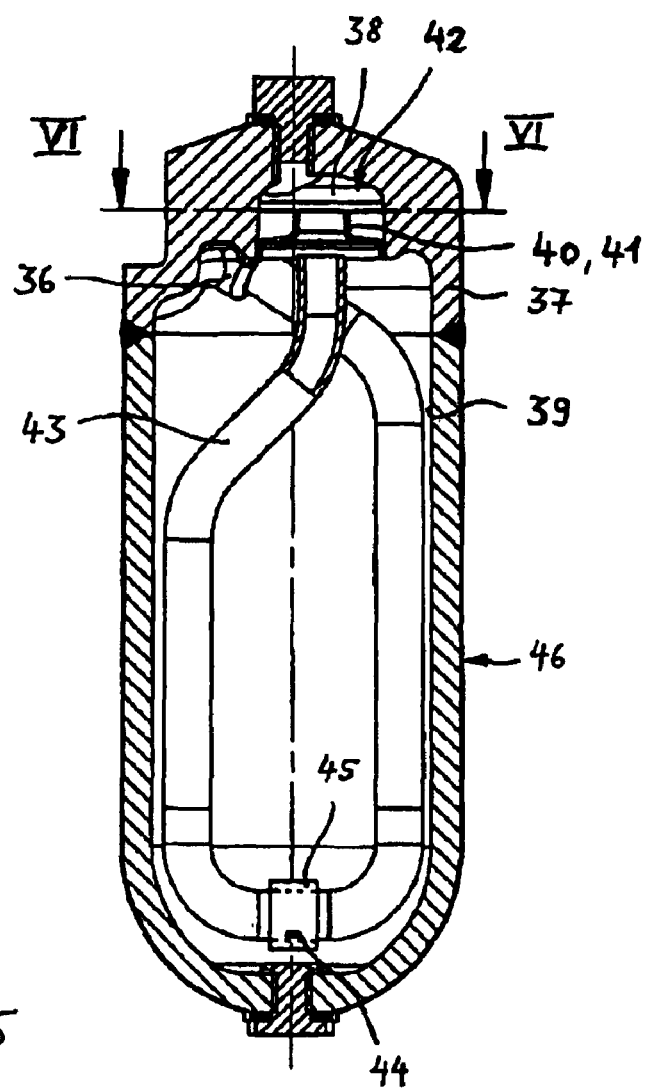
FIG. 5 shows an axial section through a collector corresponding to a third exemplary embodiment of the invention.
Figure 6:
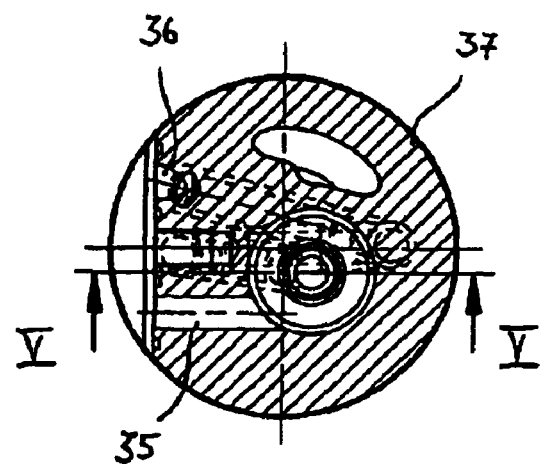
FIG. 6 shows a radial section through the collector according to FIG. 5.

The exemplary embodiment according to FIGS. 5 and 6, which is particularly advantageous in respect of the production of the collector, differs from that according to FIGS. 3 and 4 essentially by the fact that the upper region of the collector, including the cyclone chamber 38, which region has the connecting pipes 35 and 36, is designed as a bell-shaped cast or forged part 37 which is connected to the cylindrical wall 39, by welding, for example. The inner part of the cyclone-like separating device 42, which part forms the outflow connecting pipe 40, is inserted as a deep-drawn sheet-metal part 41 into the bellshaped cast or forged part 37 and fastened.

In order to be able to lead the connecting pipe 36, which is connected directly to the guide tube 43, laterally out of the collector next to the other connecting pipe 35 without a right-angle deflection in accordance with the exemplary embodiment according to FIG. 3, the guide tube 43 has a loopshaped shaped profile, with a crossover in the upper region 37 of the collector.

In order to filter off impurities, that part of the guide tube 43 which has the hole 44 is provided with a sleeve-like filter part 45 which is placed around the guide tube 43 in the lower region. The hole 44 is arranged on the lower side of the guide tube for the purpose of easy accessibility. In order to retain moisture, an absorbing dry substance may be arranged within the collector in a manner which is not illustrated.

What is claimed is:

1. A collector for a liquid phase of a working medium of an air conditioning system, comprising:
    a first connecting pipe provided for connection into a circuit of the air conditioning system,
    a second connecting pipe, and
    a guide tube which is connected to the second connecting pipe and is guided through an interior of a container in such a manner that part of the guide tube runs through a lower bottom region of the container and an open end of the guide tube is situated in an upper region of the container,
    wherein the part of the guide tube which runs through the bottom region has at least one opening for recycling collected oil and the liquid phase of the working medium into the working medium circulating through the air conditioning system,
    wherein, in order to separate off the liquid phase, a separating device having a cyclone chamber and an outflow connecting pipe forming an overflow is provided, and
    wherein the first connecting pipe leads tangentially into the cyclone chamber, with the open end of the guide tube ending at a short distance from the outflow connecting pipe in the upper region of the container.

2. The collector as claimed in claim 1, wherein the separating device is arranged centrally at the upper end of the container, wherein the container is cylindrical, and wherein an inner wall of the container upwardly forms the outflow connecting pipe in the shape of a bottle neck.

3. The collector as claimed in claim 2, wherein the first and second connecting pipes are provided at the upper and lower ends of the container, and wherein the guide tube, which is guided through part of the container of the collector, runs centrally and without curvature in the direction of the separating device for separating off the liquid phase.

4. The collector as claimed in 2, wherein the open end of the guide tube ends at a distance before the outflow connecting pipe corresponding to half of the diameter of the guide tube.

5. The collector as claimed in claim 4, wherein the guide tube has a loop-shaped profile, with a crossover in an upper region of the collector.

6. The collector as claimed in claim 5, wherein the upper region of the collector has the cyclone chamber and is designed as a bell-shaped cast or forged part which is connected to a cylindrical wall forming the container of the collector.

7. The collector as claimed in claim 6, wherein the inner part of the separating device forms the outflow connecting pipe and is inserted as a deep-drawn sheet-metal part into the bell-shaped cast or forged part and fastened.

8. The collector as claimed in claim 1, wherein the first and second connecting pipes are provided at the upper and lower ends of the container, and wherein the guide tube, which is guided through part of the container of the collector, runs centrally and without curvature in the direction of the separating device for separating off the liquid phase.

9. The collector as claimed in 8, wherein the open end of the guide tube ends at a distance before the outflow connecting pipe corresponding to half of the diameter of the guide tube.

10. The collector as claimed in claim 9, wherein the guide tube has a loop-shaped profile, with a crossover in an upper region of the collector.

11. The collector as claimed in claim 10, wherein the upper region of the collector has the cyclone chamber and is designed as a bell-shaped cast or forged part which is connected to a cylindrical wall forming the container of the collector.

12. The collector as claimed in claim 11, wherein the inner part of the separating device forms the outflow connecting pipe and is inserted as a deep-drawn sheet-metal part into the bell-shaped cast or forged part and fastened.

13. The collector as claimed in claim 1, wherein the first and second connecting pipes are provided at the top of the container so that the guide tube is guided through the container starting at the top of the container, and wherein said guide tube has, in the bottom region, a deflection at which the at least one opening for recycling the collected oil and the liquid phase into the working medium is provided.

14. The collector as claimed in claim 13, wherein the open end of the guide tube ends at a distance before the outflow connecting pipe corresponding to half of the diameter of the guide tube.

15. The collector as claimed in claim 14, wherein the guide tube has a loop-shaped profile, with a crossover in an upper region of the collector.

16. The collector as claimed in claim 15, wherein the upper region of the collector has the cyclone chamber and is designed as a bell-shaped cast or forged part which is connected to a cylindrical wall forming the container of the collector.

17. The collector as claimed in claim 16, wherein the inner part of the separating device forms the outflow connecting pipe and is inserted as a deep-drawn sheet-metal part into the bell-shaped cast or forged part and fastened.

18. The collector as claimed in 1, wherein the open end of the guide tube ends at a distance before the outflow connecting pipe corresponding to half of the diameter of the guide tube.

19. The collector as claimed in claim 18, wherein the guide tube has a loop-shaped profile, with a crossover in an upper region of the collector.

20. The collector as claimed in claim 19, wherein the upper region of the collector has the cyclone chamber and is designed as a bell-shaped cast or forged part which is connected to a cylindrical wall forming the container of the collector.

21. The collector as claimed in claim 20, wherein the inner part of the separating device forms the outflow connecting pipe and is inserted as a deep-drawn sheet-metal part into the bell-shaped cast or forged part and fastened.

* * * * *